US008873852B2

(12) United States Patent
Zhang et al.

(10) Patent No.: US 8,873,852 B2
(45) Date of Patent: Oct. 28, 2014

(54) METHOD AND APPARATUS FOR FOREGROUND OBJECT DETECTION

(75) Inventors: Tao Zhang, Sunnyvale, CA (US); Yu-Pao Tsai, Kaohsiung (TW)

(73) Assignee: MEDIATEK Singapore Pte. Ltd, Singapore (SG)

( * ) Notice: Subject to any disclaimer, the term of this patent is extended or adjusted under 35 U.S.C. 154(b) by 350 days.

(21) Appl. No.: 13/248,242

(22) Filed: Sep. 29, 2011

(65) Prior Publication Data

US 2013/0084006 A1   Apr. 4, 2013

(51) Int. Cl.
*G06K 9/34* (2006.01)
*G06K 9/00* (2006.01)
*G06T 7/00* (2006.01)

(52) U.S. Cl.
CPC ..... *G06T 7/0081* (2013.01); *G06T 2207/10028* (2013.01); *G06T 7/0087* (2013.01); *G06T 2207/20144* (2013.01)
USPC ............................. 382/173; 382/103; 382/154

(58) Field of Classification Search
None
See application file for complete search history.

(56) References Cited

U.S. PATENT DOCUMENTS

| | | | | |
|---|---|---|---|---|
| 6,999,620 | B1 * | 2/2006 | Harville | 382/173 |
| 7,274,800 | B2 * | 9/2007 | Nefian et al. | 382/103 |
| 7,317,830 | B1 * | 1/2008 | Gordon et al. | 382/173 |
| 7,415,164 | B2 * | 8/2008 | Wren et al. | 382/280 |
| 7,813,528 | B2 * | 10/2010 | Porikli et al. | 382/103 |
| 2004/0075756 | A1 * | 4/2004 | Bean et al. | 348/239 |
| 2004/0151342 | A1 * | 8/2004 | Venetianer et al. | 382/103 |
| 2006/0028552 | A1 * | 2/2006 | Aggarwal et al. | 348/169 |
| 2007/0122000 | A1 * | 5/2007 | Venetianer et al. | 382/103 |
| 2007/0133880 | A1 * | 6/2007 | Sun et al. | 382/195 |
| 2007/0280540 | A1 * | 12/2007 | Ikeda | 382/195 |
| 2008/0247599 | A1 * | 10/2008 | Porikli et al. | 382/103 |
| 2009/0060278 | A1 * | 3/2009 | Hassan-Shafique et al. | 382/103 |
| 2010/0128930 | A1 * | 5/2010 | Liu et al. | 382/103 |
| 2010/0316257 | A1 * | 12/2010 | Xu et al. | 382/103 |
| 2011/0293137 | A1 * | 12/2011 | Gurman et al. | 382/103 |
| 2012/0092458 | A1 * | 4/2012 | Dedeoglu et al. | 348/46 |
| 2013/0028467 | A9 * | 1/2013 | Millar et al. | 382/103 |
| 2013/0051613 | A1 * | 2/2013 | Bobbitt et al. | 382/103 |
| 2013/0230234 | A1 * | 9/2013 | Gurman et al. | 382/154 |

FOREIGN PATENT DOCUMENTS

JP         2000076454 A   *   3/2000   ............... G06T 7/00

OTHER PUBLICATIONS

Stauffer and Grimson, "Adaptive Background Mixture Models for Real-Time Tracking", published in IEEE International Conference on Computer Vision and Pattern Recognition, vol. 2, pp. 246-252, Aug. 1999.
Elgammal, et al., "Non-parametric Model for Background Subtraction", published in ECCV '00 Proceedings of the 6th European Conference on Computer Vision-Part II, pp. 751-767, 2000.

(Continued)

*Primary Examiner* — Wenpeng Chen
(74) *Attorney, Agent, or Firm* — Blairtech Solution LLC

(57) ABSTRACT

The present invention utilizes depth images captured by a depth camera to detect foreground/background. The method comprises establishing a single background distribution model, updating the background distribution model if a new depth value for the pixel can be represented by the background distribution model, skipping update of the background distribution model if the pixel is before the background, and replacing the background distribution model if the pixel is behind the background. In case that the background distribution model does not exist initially, a new background distribution model is created. The fluctuation of the depth value due to noise is handled by using a candidate background distribution model. Furthermore, the noise for pixels around object edges is handled by using a mixture of two background distribution models.

2 Claims, 7 Drawing Sheets

(56) References Cited

OTHER PUBLICATIONS

Kim, et al., "Real-Time Foreground-Background Segmentation Using Codebook Model", published in Real-Time Imaging, vol. 11, Issue 3, pp. 172-185, Jun. 2005.

Harville, et al., "Foreground Segmentation Using Adaptive Mixture Models in Color and Depth", published in Proceedings IEEE Workshop on Detection and Recognition of Events in Video, pp. 3-11, Jul. 2001.

* cited by examiner

METHOD AND APPARATUS FOR FOREGROUND OBJECT DETECTION

FIELD OF THE INVENTION

The present invention relates to video data processing. In particular, the present invention relates to foreground object detection based on depth images.

BACKGROUND

Foreground object detection is a process to separate foreground objects from the background in images captured from a video camera. Foreground object detection has various applications, such as video surveillance or object-based video coding. Methods being practiced for foreground object detection are generally based on background subtraction with the assumption that cameras are stationary and a background model can be created and updated over time. There are several popular techniques being practiced in the field, including adaptive Mixture of Gaussian (MOG), Kernel Density Estimation (KDE) and Codebook methods. All these foreground/background detection methods utilize image processing techniques to process color/intensity images captured by a video camera, where the captured images do not contain depth information. The above color/intensity-based techniques usually involve high computational complexity and the detection result may not be satisfactory. A method based on Mixture of Gaussian has been applied to images with combined depth and color information. Nevertheless, the MOG based approach simply treats the depth information as a color component and results in even higher computational complexity. Accordingly, it is desirable to develop low-complexity foreground object detection method and apparatus that utilize the depth information from depth images to detect foreground/background in the scene associated with the depth images.

BRIEF SUMMARY OF THE INVENTION

A method and apparatus for foreground object detection for a pixel from depth images are disclosed. In one embodiment according to the present invention, the method and apparatus for foreground object detection for the pixel from depth images comprise steps of receiving a depth value for the pixel from the depth images; updating a first background distribution model according to the depth value and labeling an indication of the pixel as first background if the pixel can be represented by the first background distribution model; processing alternative background model if the pixel is behind the first background; labeling the indication of the pixel as foreground if the pixel is before the first background; and providing the indication of the pixel. The pixel can be represented by the first background distribution model if the depth value is within a range covering a first value associated with the first background distribution model. In one embodiment, the first background distribution model conforms to a Gaussian distribution model having a mean and a standard deviation, wherein the first value is related to the mean and the range is related to the standard deviation. The pixel is behind the first background if the depth value is larger than the first value, and the pixel is before the first background if the depth value is smaller than the first value. If the first background distribution model does not exist, a new first background distribution model is established. In one embodiment of the present invention, the pixel value is checked to determine whether the depth value is meaningful and indication of the pixel is labeled as the first background if the pixel value is non-meaningful. One aspect of the present invention is related to processing alternative background model. In one embodiment of the present invention, the first background distribution model is replaced by a new first background distribution model according to the depth value or a previous depth value of a corresponding pixel in a previous frame. In another embodiment of the present invention, said processing alternative background model comprises establishing a second background distribution model according to the depth value if the second background distribution model does not exists; replacing the first background distribution model by the second background distribution model if a noise evaluation indicates a second background associated with the second background distribution model as a true background; and discarding the second background distribution model if the noise evaluation indicates the second background as a noise. In addition, background confidence associated with the indication of the pixel is also disclosed. Furthermore, a fixed background distribution model having a first value and a second value is disclosed, wherein the pixel can be represented by the first background distribution model if difference between the depth value and the first value is within an error tolerance associated with the second value, and wherein the first value and the second value are non-updatable.

In another embodiment according to the present invention, the method and apparatus for background detection for a pixel around object edges from depth images using a first background distribution model or a mixture of the first background distribution model and a second background distribution model are disclosed. The method and apparatus comprises steps of receiving a depth value for the pixel from the depth images; updating the first background distribution model according to the depth value if the pixel can be represented by the first background distribution model; skipping update of the first background distribution model if the pixel is before a background associated with the first background distribution model; establishing a candidate background distribution model and evaluating a first occurrence frequency and a second occurrence frequency associated with representation of the pixel by the first background distribution model or the candidate background distribution model respectively, if the pixel is behind the background associated with the first background distribution model; establishing the second background distribution model from the candidate background distribution model if the first occurrence frequency and the second occurrence frequency indicates high occurrence; discarding the candidate background distribution model if the first occurrence frequency indicates the high occurrence and the second occurrence frequency indicates low occurrence; replacing the first background distribution model by the candidate background distribution model if the first occurrence frequency indicates the low occurrence and the second occurrence frequency indicates the high occurrence; and processing the pixel using the mixture of the first background distribution model and the second background distribution model if the second background distribution model exists, and using a single background distribution model based on the first background distribution model otherwise.

DETAILED DESCRIPTION OF THE INVENTION

Figure 1:
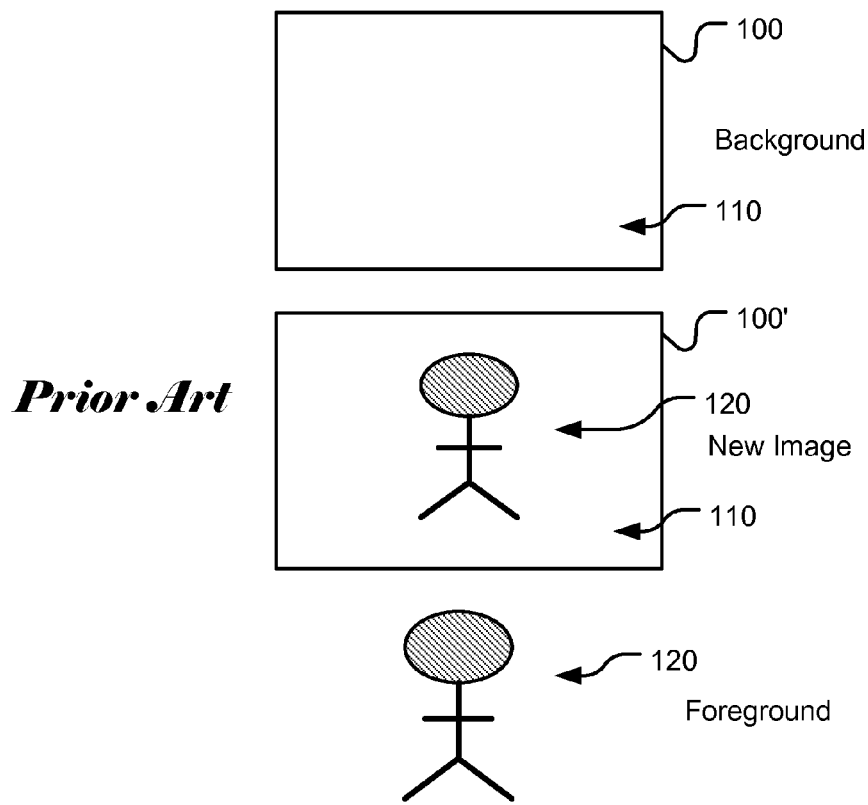
FIG. 1 illustrates a prior art of foreground detection based on color/intensity images by subtracting a known background.

Foreground object detection is a process to separate foreground objects from the background in images captured from a video camera. Foreground object detection has various applications, such as video surveillance or object-based video coding. Methods for foreground object detection are generally based on background subtraction with the assumption that cameras are stationary and a background model can be created and updated over time. When a new video frame is received, the background model is subtracted from this new video frame to obtain foreground objects, and the background model is updated at the same time using this new video frame. FIG. 1 illustrates a sample foreground detection based on color/intensity images by subtracting a known background. The method illustrated in FIG. 1 is the key concept of conventional approaches that assume the background 110 in an image 100 can be established. When a new image 100' containing a foreground object 120 is received, the foreground object 120 can be obtained by subtracting the background image 100 from the new image 100'.

Many foreground object detection methods based on background subtraction have been described in the literature, where images are captured primarily using intensity cameras (color or gray scale) or thermal cameras. The main idea behind such method for foreground object detection assumes that a background model can be built beforehand. Furthermore, it assumes that the camera is stationary and the scene is empty initially. However, the requirement that the scene is empty initially is too restrictive to meet in real environment. There are several popular techniques being practiced in the field, including adaptive Mixture of Gaussian (MOG), Kernel Density Estimation (KDE) and Codebook methods. The main differences in these methods are how to represent the foreground or background, how to determine the background and how to update the models.

Figure 2:
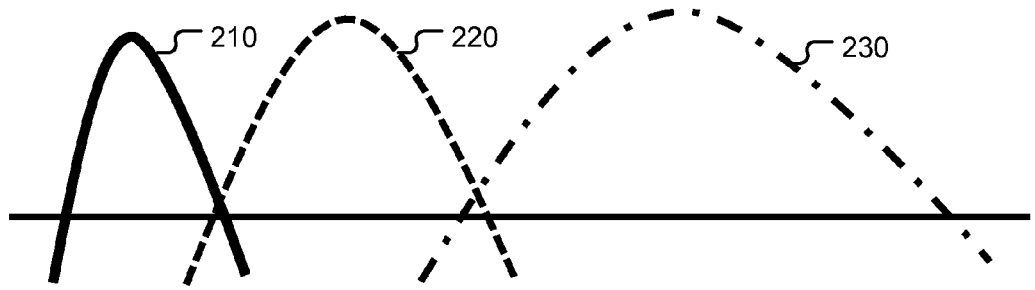
FIG. 2 illustrates a prior art of foreground detection based on color/intensity images using Mixture of Gaussian (MOG) method.

The adaptive Mixture of Gaussian (MOG) method is disclosed by Stauffer and Grimson, in a paper entitled "Adaptive Background Mixture Models for Real-Time Tracking", published in *IEEE International Conference on Computer Vision and Pattern Recognition*, Volume 2, Pages 246-252, August 1999. The MOG method represents each pixel in the foreground and background as a mixture of Gaussian distributions. A pixel is classified as background if the weighted sum of decreasingly sorted Gaussian distributions is greater than a predefined threshold. According to the MOG method, the recent history of each pixel $\{X_1, \ldots, X_t\}$, is modeled by a mixture of K Gaussian distributions. The probability of observing the current pixel vale is:

$$P(X_t) = \sum_{i=1}^{K} \varpi_{i,t} * \eta\left(X_t, \mu_{i,t}, \sum_{i,t}\right) \qquad (1)$$

where K is the number of distributions, $\overline{\omega}_{i,t}$ is an estimate of the weight of the i-th Gaussian in the mixture at time t, $\mu_{i,t}$ is the mean value of the i-th Gaussian distribution in the mixture at time t, $\Sigma_{i,t}$ is the co-variance matrix of the i-th Gaussian in the mixture at time t, and $\eta$ is a Gaussian probability density function. FIG. 2 illustrates an example of MOG where three Gaussian distributions 210, 220 and 230 are used. A model update rule is also described in the paper by Stauffer and Grimson. If a new value can be represented by a Gaussian distribution, the associated Gaussian distribution is updated and weights for other distributions are decrease. If the new value cannot be represented by a Gaussian distribution, a new Gaussian distribution is added if existing number of distributions is less than a pre-defined number. Otherwise, one of the distributions is indentified and replaced. Stauffer and Grimson also disclosed a background model estimation method, where the Gaussian distributions are ordered by the value of $\omega/\delta$, where $\omega$ is the weight and $\delta$ is the standard deviation associated with the Gaussian distribution. The first B Gaussian distributions are chosen as the background model, where $$B = \arg\min_b \left(\sum_{k=1}^{b} \varpi_k > T\right), \qquad (2)$$

and where T is a measure of the minimum portion of the data that should be accounted for by the background. According to the MOG method, K Gaussian distribution models have to be maintained and updated, which results in high computational complexity.

The KDE method is disclosed by Elgammal, et al., in a paper entitled "Non-parametric Model for Background Subtraction", published in *ECCV '00 Proceedings of the 6th European Conference on Computer Vision*-Part II, pages 751-767, 2000. In the KDE based method, foreground and background at each pixel is represented as kernel densities. Let $\{x_1, x_2, \ldots, x_N\}$ be a recent sample of intensity values for a pixel. Based on these samples, the probability density function for the pixel can be estimated using the kernel estimator K as $$Pr(x_t) = \frac{1}{n}\sum_{i=1}^{N} K(x_t - x_i). \qquad (3)$$

The kernel estimator K can be a Gaussian function. Using this probability estimation, the pixel is considered as a foreground pixel if the kernel density value at this pixel is less than a threshold, i.e., $Pr(x_t)<th$, where the threshold th is a global threshold over all the images that can be adjusted to achieve a desired percentage of false positives. Elgammal, et al., also discloses a model update rule, where a new sample is added to the model only if the new sample is classified as a background sample. The update is performed in a first-in first-out (FIFO) manner. That is, the oldest sample/pair is discarded and a new sample/pair is added to the model. The KDE method also involves high computational complexity since a sizeable samples have to be buffered (N is typically around 100).

A codebook model method is disclosed by Kim, et al., in a paper entitled "Real-Time Foreground-Background Segmentation Using Codebook Model", published in *Real-Time Imaging*, Volume 11, Issue 3, pages 172-185, June 2005. In the Codebook based method, background at each pixel is represented as several codes with statistics information such as frequency of appearance. A pixel is classified as background if the brightness is within a predefined range and its color distance is less than a threshold. The codebook based method involves a training stage where a codebook is created. If no match can be found for a pixel, a new codeword is created. If a match is found for the pixel, the corresponding codeword is updated. The corresponding background subtraction tries to find a matching codeword. If no matching is found for the pixel, the pixel is declared as a foreground pixel; otherwise the pixel is declared as a background pixel and the corresponding codeword is updated. Again, the Codebook method results in high computational complexity due to codebook training and update.

The above intensity (color or gray level) based foreground object detection methods are mainly designed to cope with difficult situations such as moving background and changing illumination. One common characteristic of these methods is that the history of a pixel is generally maintained as much as possible except for the limitation by the number of components allowed in the system, such as the number of Gaussian distributions, the buffer size in KDE method or the number of codebooks. For example, in MOG based methods, if a new value at a pixel does not belong to existing Gaussian distributions, a new Gaussian distribution will be created to represent the new value and the new Gaussian distribution is added to the mixture of Gaussian distributions unless the pre-specified number of mixtures has been reached. When no more new distributions are allowed, a least favorable distribution will be identified and replaced by this newly created distribution according to some rules.

Figure 3:
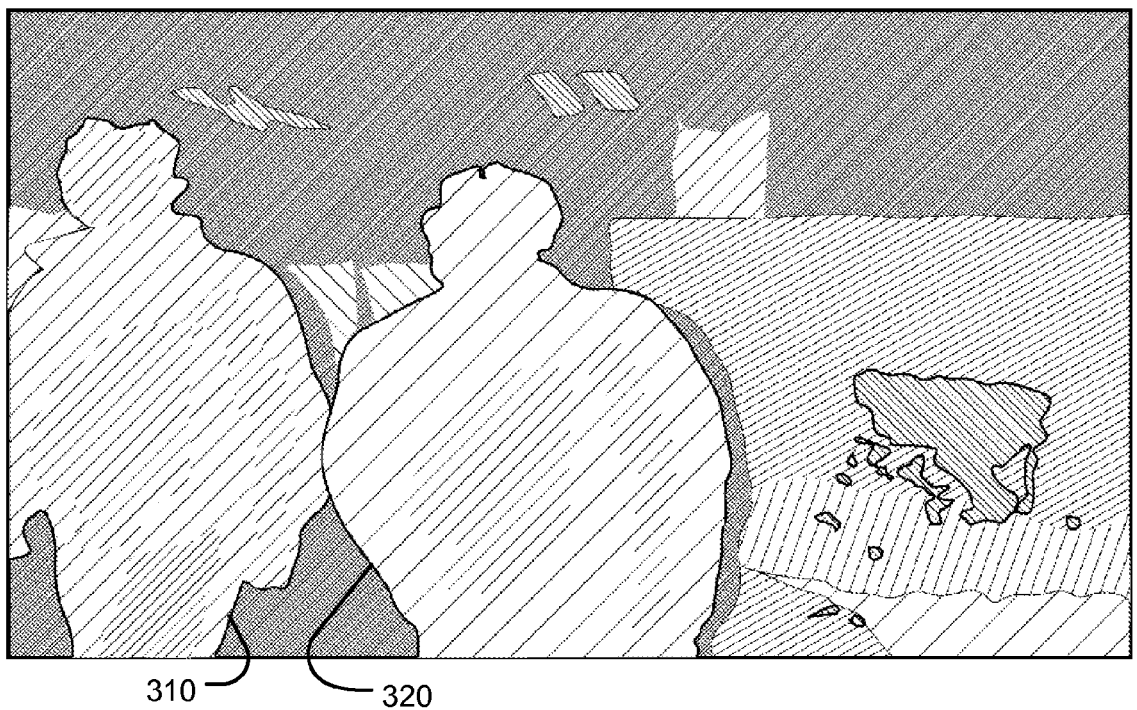
FIG. 3 illustrates an exemplary depth image corresponding to two human subjects in the foreground.

Depth camera is another type of camera which provides the distance information between the camera to a point in the scene instead of intensities or colors. Depth cameras are becoming more popular in gaming due to the potential wide use in human-computer interactions. Furthermore, the cost of depth cameras continues to decline. FIG. 3 illustrates an exemplary depth image corresponding to two human subjects 310 and 320 in the foreground. The depth is represented by the gray level of the depth image. A higher level (brighter intensity) represents a closer distance and a lower level (darker intensity) represents a farther distance. To detect foreground object in depth images generated by a depth camera, existing methods simply use background subtraction methods which were designed for intensity cameras. Therefore, the depth information is considered as another dimension beyond the color information. For example, a foreground object detection method based on both color and depth information is disclosed by Harville, et al., in a paper entitled "Foreground Segmentation Using Adaptive Mixture Models in Color and Depth", published in *Proceedings IEEE Workshop on Detection and Recognition of Events in Video*, Pages 3-11, July 2001. The computation cost using both depth and color information is generally high. Color information is not helpful when the scene is dark. The difference between a depth camera and an intensity camera (color or gray scale) suggests that simply applying the methods designed for the color camera may not produce expected results. For example, illumination change is a challenging issue to video analysis in intensity images; however, it is not a problem for image processing in depth images. If existing methods are applied to depth images directly, the foreground/background detection results may not be satisfactory. Therefore, it is desirable to develop a reliable and low-cost foreground object detection method and system based on depth images.

Figure 4:
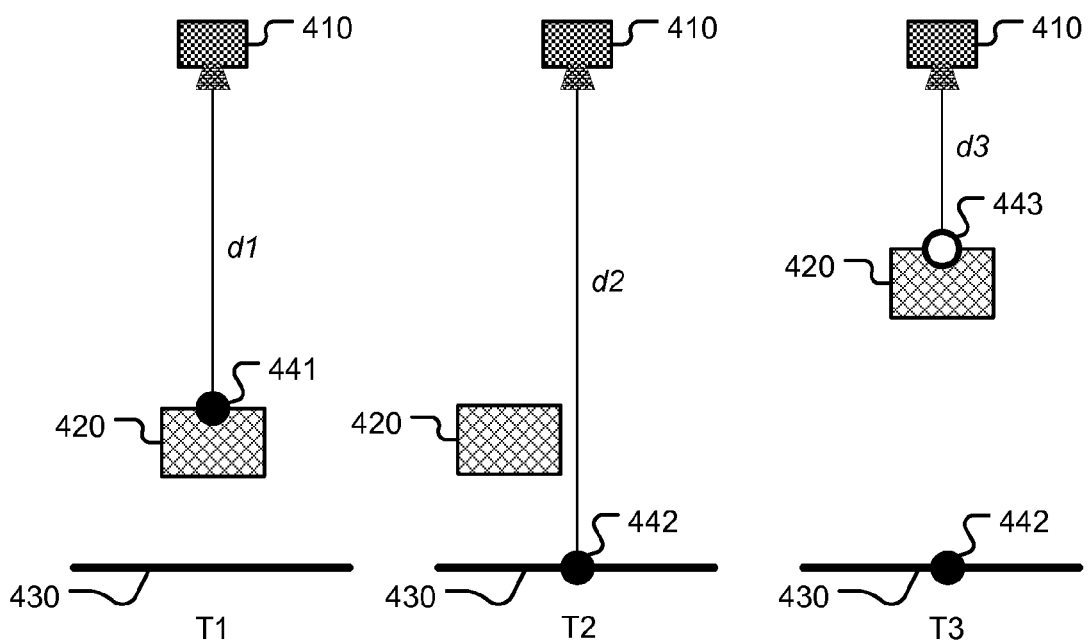
FIG. 4 illustrates exemplary background determination based on depth information incorporating an embodiment of the present invention.

In the depth image, the distance between a background and the depth camera corresponding to a pixel in the depth image at different time instances can be modeled by a single Gaussian distribution. Furthermore, the real background is always the farthest point perceived by the depth camera. FIG. 4 illustrates an exemplary scenario where a depth camera 410 is used to capture depth images, where foreground object 420 is located in front of background 430. At time instance T1, the foreground object is in front of the depth camera at distance d1. The corresponding pixel produces distance information associated with d1. At time instance T2, foreground object 420 moves to the left and the corresponding pixel produces distance information associated with d2. Since the new depth is farther, the pixel belongs to the background according to the present invention and the current background is updated. At time instance T3, foreground object 420 moves closer in front of the depth camera and the corresponding pixel produces distance information associated with d3. However, background determination based on depth information incorporating an embodiment of the present invention assumes that the background always has farther distance and the pixel will not be updated for background at time T3. Accordingly, a method incorporating an embodiment of the present invention provides correct background determination at time T3. The update rule for a background depth value at a pixel is (a) to update current Gaussian distribution using the depth value if the depth value can be represented by current Gaussian background distribution; (b) otherwise, not to update the background model if the depth value is less than the depth values represented by current Gaussian distribution, i.e., the pixel is in foreground; and (c) to replace the current Gaussian distribution with a new one with the new depth value as the mean value if the depth value is larger than the depth values represented by current Gaussian distribution, i.e., the pixel is behind the current background. In the above discussion, the Gaussian distribution is mentioned as an example to practice the present invention. However, other distribution functions may also be used.

According to the description, an exemplary procedure incorporating an embodiment of the present invention is described as follows:

Step 1. Read a depth value d for a pixel

Step 2. If a background model (m, μ) for this pixel does not exist, create a new Gaussian distribution to represent the background at this pixel:
    a. Set m=d, μ=μl, (μl is a predefined value), and
    b. Label the current pixel as a background pixel.

Step 3. If a background model (m, μ) exists:
    a. If d can be represented by the distribution (for example, |d−m|<2,μ), update the Gaussian distribution and label the current pixel as a background pixel.
    b. Otherwise,
        i. If d<m, not to update. Label current pixel as a foreground pixel.

ii. If d>m, set m=d, μ=μl (i.e., to replace it with a farther new depth Gaussian distribution), label current pixel as a background pixel.

Step 4. Repeat from step 1.

Figure 5:
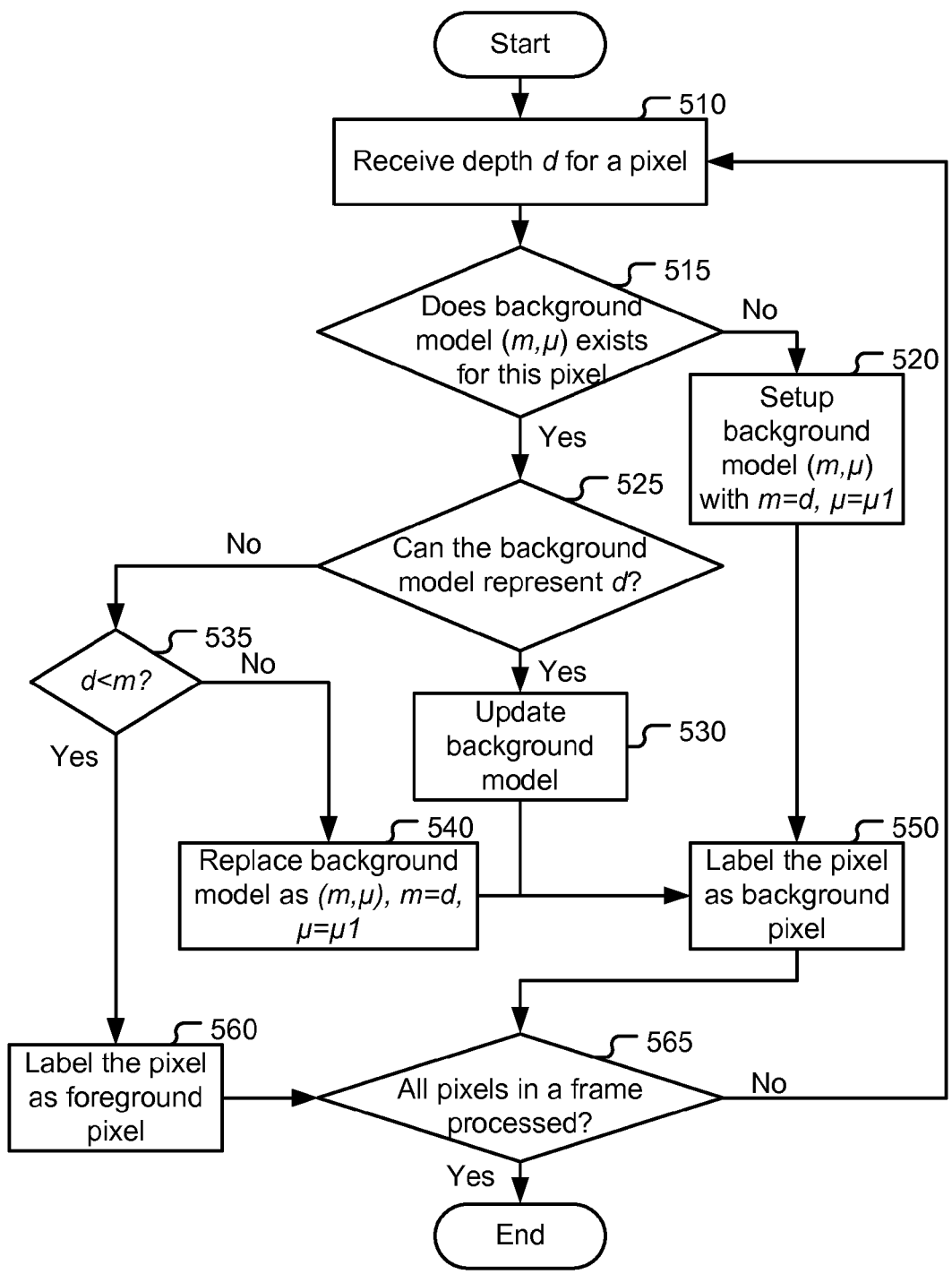
FIG. 5 illustrates an exemplary flow chart of foreground object detection based on depth information incorporating an embodiment of the present invention.

An exemplary flow chart corresponding to the above procedure is illustrated in FIG. 5. Upon Start, depth value d for a pixel is received as shown in block 510. Whether a background model (m, μ) exists for this pixel is checked in block 515. If the model exists, the process further checks whether the background model can represent depth value d as shown in block 525. If the model does not exist, the process creates a new Gaussian distribution to represent the background for this pixel by setting m=d, and μ=μl as shown in block 520. The pixel is then labeled as a background pixel in block 550. For block 525, if the depth value d is within a given distance from the mean value m of the Gaussian model, such as |d−m|<λμ, where λ is a predefined value, the background model is considered to be able to represent depth value d. While the given distance from the mean value m is used in the above example to determined whether a pixel can be represented by the background distribution model, a range covering the mean value may be used as well. For example, the range m−λ$_1$μ<d<m+λ$_2$μ may be used to determine whether the pixel can be represented by the background distribution model, where λ$_1$ and λ$_2$ are positive numbers. In this case, the background model is updated as shown in block 530 and the pixel is then labeled as a background pixel in block 550. For block 525, if depth value d cannot be represented by the background model, the process checks whether d<m in block 535. If d is smaller than m, it indicates that the new pixel is closer than the background and the pixel is labeled as a foreground pixel as shown in block 560. Otherwise, the background model is replaced by setting m=d and μ=μl as shown in block 540 and the pixel is then labeled as a background pixel in block 550. After the pixel is labeled, the process checks whether all pixels in the frame are processed in block 565. If there are still pixels not processed yet, the procedure returns to block 510 to process remaining pixels. Otherwise, the process is terminated. Whether a pixel is labeled as a foreground pixel or a background pixel can be indicated by an indication data associated with the pixel. Again, in the above discussion, the Gaussian distribution is mentioned as an example to practice the present invention. However, other distribution functions may also be used. When a pixel cannot be represented by the background distribution model and the depth value is behind the background, block 540 in the exemplary flow chart in FIG. 5 replaces the background distribution model according to the depth value for the pixel. Nevertheless, alternative background model processing routine may be used. For example, a tentative distribution model may be temporarily buffered in a noisy environment and the replacement of the background distribution model occurs only if the tentative distribution model is determined to be due to a true background.

Though the depth cameras on the market, such as PrimeSense™ depth camera or Microsoft Kinect™ sensor may not deliver perfect quality, the above foreground object detection algorithm works fine in many simple and less noisy environments, such as an object in an empty white walled small room. However, the algorithm will not work well in real-life environment due to some limitations of current depth cameras. The current depth cameras may experience non-meaningful pixel and noise problems. A non-meaningful pixel refers to a pixel that has non-meaningful depth values outputted from a depth camera due to limitations of the depth camera. Major causes for the non-meaningful pixel include depth range limitation of the depth camera, absorption of infrared light by objects or background, and shadow. In these cases, the depth camera cannot determine the depth values reliably. For example, the PrimeSense™ depth camera has a depth range from about 50 cm to 10 m. If a depth value is out of the range, the depth value is assigned a zero value. Black objects may substantially absorb infrared light so that the depth sensor cannot measure distance associated with these objects. If pixels associated with an object or background is in a shadow of infrared light (the light source being used in most depth cameras), the depth values for the pixel cannot be measured. All these pixels that do not have meaningful depth values will be assigned a zero value in PrimeSense™ camera without differentiating the causes. If non-meaningful pixels are used to update background models, the accuracy of background models may be reduced. Therefore, it is desirable to develop a background model update scheme to improve the accuracy of background models. Accordingly, a method of foreground object detection incorporating an embodiment of the present invention handles non-meaningful pixels is disclosed. According to the present invention, if the depth value is determined to be non-meaningful, the pixel is assigned as a background pixel and however, the background model is not updated.

Noise always exists in the depth images generated by depth cameras. The major effect of noise is that depth values at a pixel will fluctuate from one value range to another value range over time. Noise may cause some problems to the foreground object detection mentioned above, such as it may lead to false background models due to updating a background model using depth values containing noise. For example, a depth value at one pixel may be larger than depth values represented by current background model (m, μ) due to noise. The background model will be updated then by a new Gaussian distribution centered at this noisy depth value (m2, μ2). In subsequent images, the depth values at this pixel may be noise free or have very low noise and the depth value may be represented by the previous Gaussian distribution (m, μ) again. According to the method associated with the flow chart of FIG. 5, this pixel will be classified as a foreground pixel when the depth camera transitions from Gaussian distribution (m2, μ2) with noise to Gaussian distribution (m, μ) without noise. The noise issue may be more prominent around edges of an object, where the depth values at edge pixels may jump back and forth around the edge. A single Gaussian distribution may not represent the background models at those pixels sufficiently.

Figure 6:
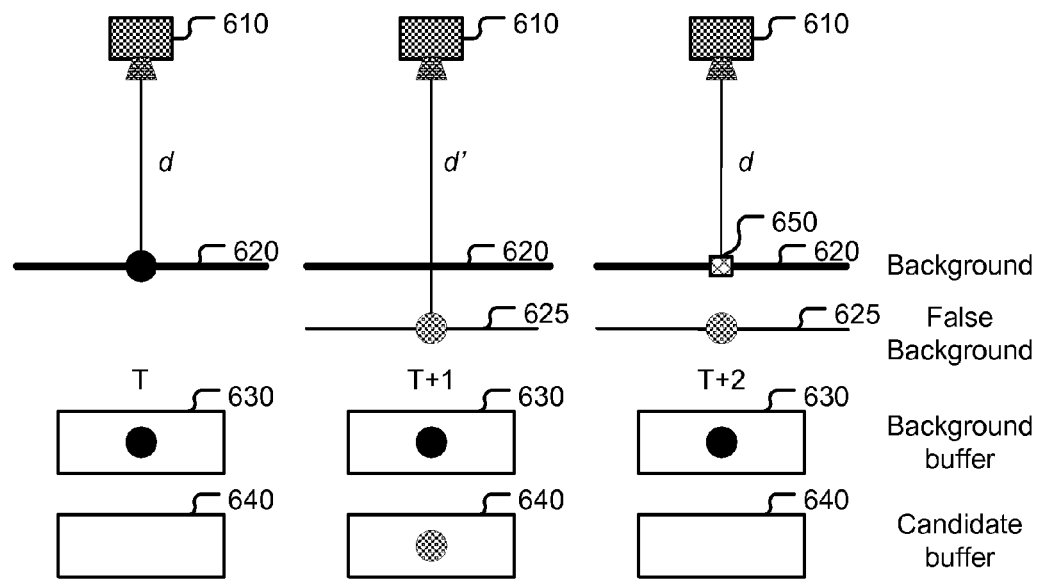
FIG. 6 illustrates exemplary background determination based on depth information incorporating an embodiment of the present invention, where the history of depth values at a pixel is used to overcome noise issue.

One means to cope with the noise issue is to conditionally update the background Gaussian distribution using some history of the depth value at a given pixel. A background Gaussian distribution update procedure incorporating an embodiment of the present invention is disclosure as follows. If a depth value d is not represented by current background Gaussian distribution (m, μ) and the depth value indicates the distance as being farther away, a new background Gaussian distribution (m2, μ2) is created. However, the new background Gaussian distribution is not used to replace the background Gaussian distribution yet. Instead, the new background Gaussian distribution is placed in a buffer as a candidate to replace current background model. This candidate background Gaussian distribution (m2, μ2) will replace the current background Gaussian distribution (m, μ) only if the count over a fixed time interval exceeds a threshold, where the count is associated with the event that new depth values can be represented by this candidate background Gaussian distribution (m2, μ2). Otherwise, the candidate background model will be discarded since it is likely caused by noise. FIG. 6 illustrates exemplary background determination based on depth information incorporating an embodiment of the present invention, where the history of depth values at a pixel is used to overcome noise issue. At time T, depth camera 610 properly detects background 620 with a distance d and the background Gaussian distribution is stored in background buffer 630. At time T+1, depth camera 610 detects false background 625 with a farther distance d' and the new background Gaussian distribution is stored in candidate buffer 640. At time T+2, depth camera 610 properly detects background 620 again with a distance d. If the method associated with the flow chart in FIG. 5 were used, the process would determine the pixel as a foreground pixel 650. However, according to the improved background update process utilizing history information, the occasional noise such as the case at time T+1 will be disregarded. Therefore, the background at time T+2 will be correctly detected.

Figure 7:
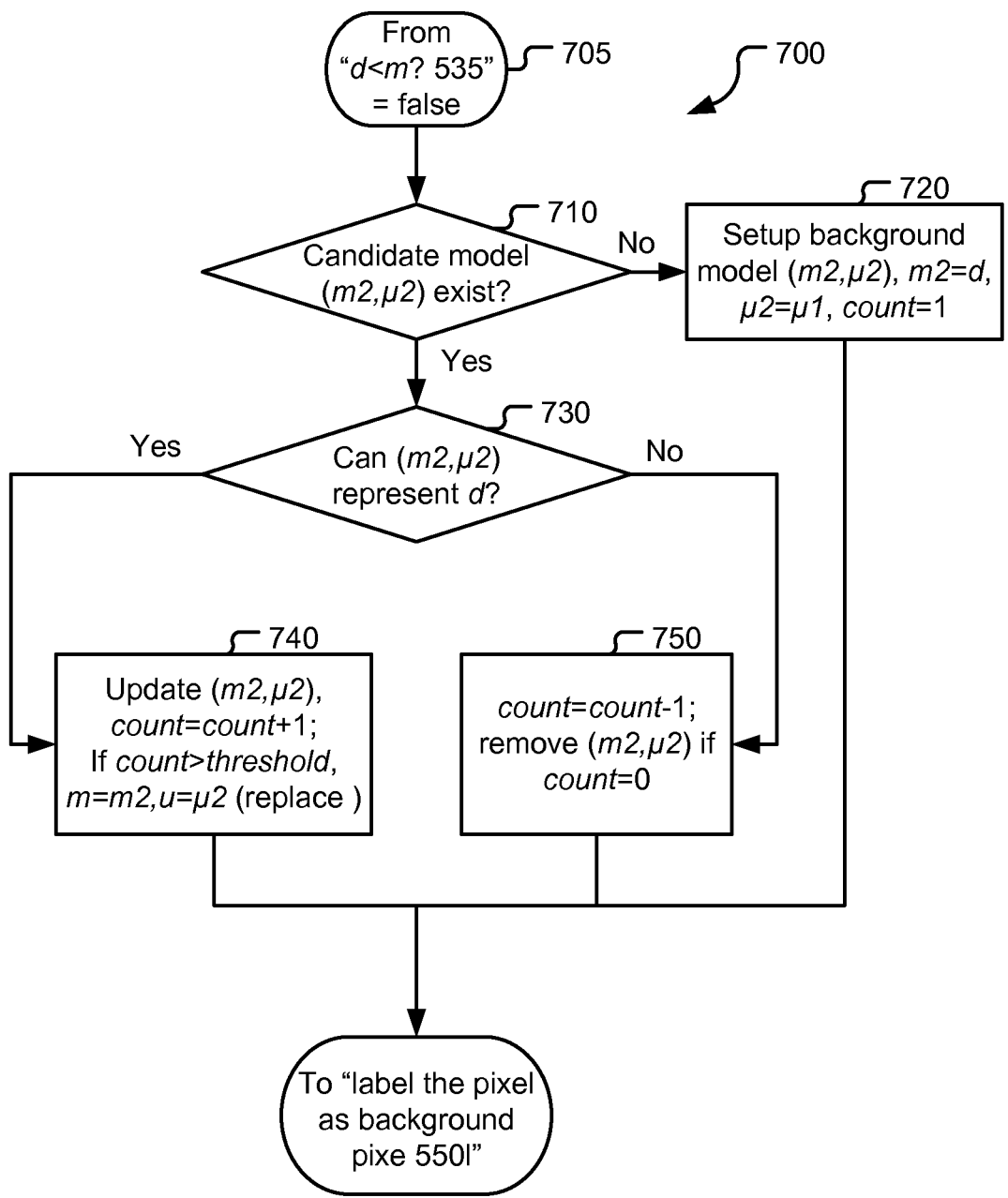
FIG. 7 illustrates an exemplary flow chart of improved background update procedure incorporating an embodiment of the present invention.

To overcome the noise issue based on the means disclosed above, the background model update routine in block 540 of FIG. 5 is revised accordingly. An exemplary flow chart of Gaussian model update 700 incorporating an embodiment of the present invention is shown in FIG. 7. The routine starts with the "No" branch of block 535, i.e., "d<m"="no". A test to check whether background distribution (m2, μ2) exists for the new depth value is performed in block 710. If background distribution (m2, μ2) does not exist for the new depth value, the process creates a candidate background distribution (m2, μ2) by setting m2=d and μ2=μ1 (a predefined value), and count=1 as shown in block 720. If background distribution (m2, μ2) exists for the new depth value, a further test to check whether background distribution (m2, μ2) can represent the new pixel value d as shown in block 730. If the test of block 730 is "yes", the process updates background distribution (m2, μ2) and increments counter as shown in block 740. If counter after being incremented is greater than a threshold, the process replaces the current background model by the candidate background model by setting m=m2 and μ=μ2 as shown in block 740. If the test of block 730 is "no", count is decremented and the candidate distribution is removed if count=0 as shown in block 750.

Figure 8:
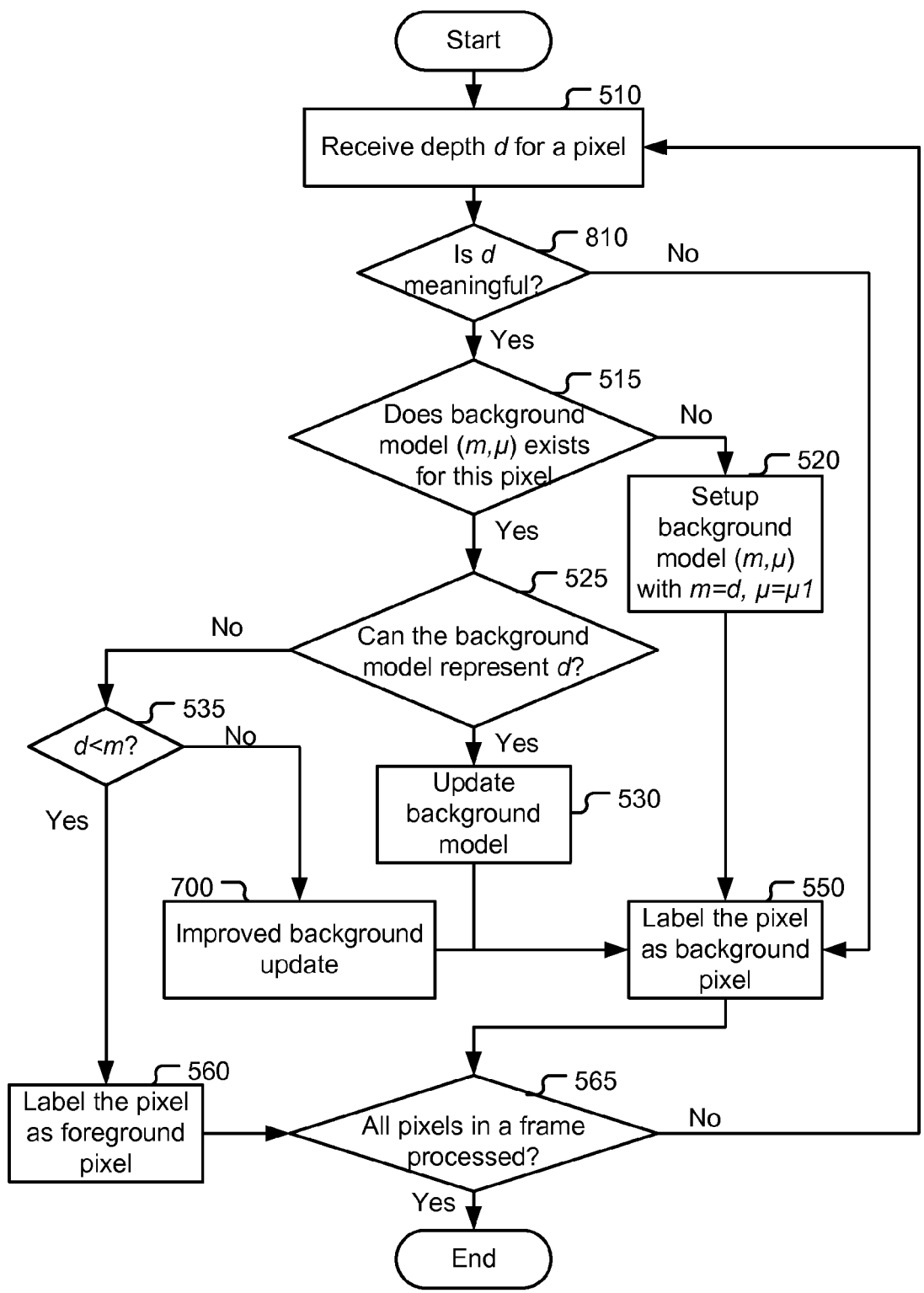
FIG. 8 illustrates an exemplary flow chart for a system incorporating an embodiment of the present invention, where the system includes improved background update procedure and also handles non-meaningful pixels.

An exemplary flow chart for a system incorporating an embodiment of the present invention is shown in FIG. 8, where the system includes improved background update procedure and also handles non-meaningful pixels. The flow chart is substantially the same as that of FIG. 5 except that a test for non-meaningful pixel is included and a new background update process is used. The blocks in FIG. 8 which are the same as these in FIG. 5 will use the same reference numbers. In FIG. 8, after a new depth value d is received in block 510, a test to check whether the depth value is meaningful is performed in block 810. If the pixel is a non-meaningful pixel, the pixel is labeled as a background pixel as shown in block 550. If the pixel is a meaningful pixel, it will be tested to check whether a background model exists for this pixel as shown in block 515. The background model update routine 540 in FIG. 5 is replaced by the improved background model update routine 700 in FIG. 8. The details of the improved background model update routine 700 are shown in FIG. 7. The exemplary flow charts in FIGS. 5, 7 and 8 are intended as illustrations to show embodiments of the present invention. The particular arrangement and steps shall not be construed as limitations to the present invention.

Figure 9:
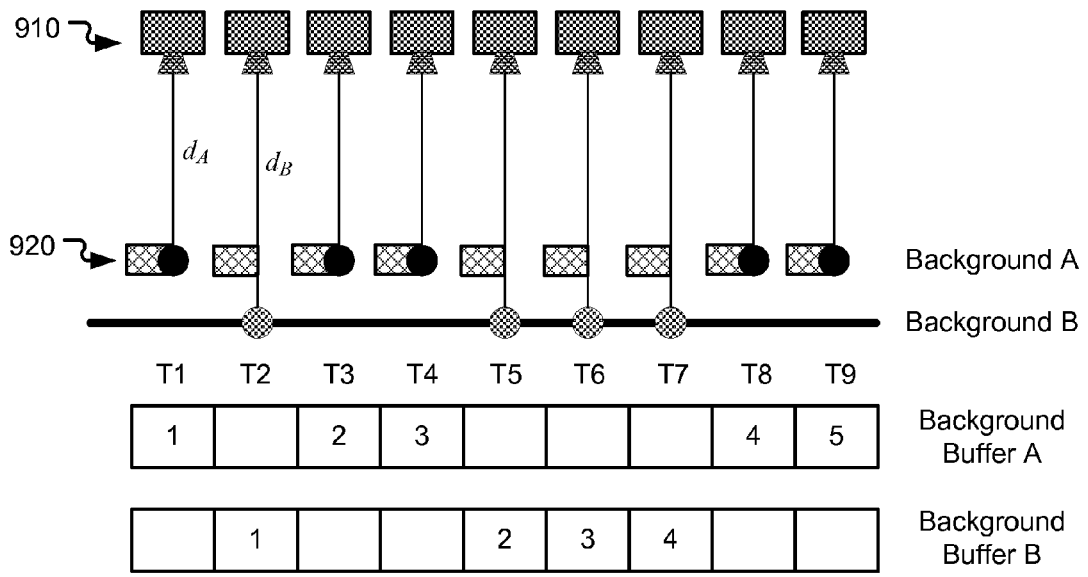
FIG. 9 illustrates exemplary background determination based on depth information with dual-model method incorporating an embodiment of the present invention.

As mentioned previously, the noise around object edges may be more prominent and a single background model may not be sufficient to represent the depth value. The noise around object edges can be alleviated by using a mixture of two background distribution models for pixels in the object edges. Due to noise, the depth values at edge locations will jump back and forth, i.e., oscillating between first background depth values and second background depth values. A mixture of two background distribution models will work well at edge pixels. The procedure to cope with noise at object edges is described as follows. First, the candidate background Gaussian distribution is stored in a buffer similar to the case of depth camera noise described previously. If both frequencies of the candidate background model and the current background model are high (by comparing with predefined thresholds), the case may be considered as oscillating between background models. Therefore, the candidate depth value is added as the second background Gaussian distribution. FIG. 9 illustrates exemplary background determination based on depth information with a mixture of two Gaussian models. The edge of object 920 is located in front of depth camera 910. Sometimes, the depth camera perceives a depth value centered at $d_A$ and other times the depth camera perceives a depth value centered at $d_B$. If the depth can be represented by Gaussian model ($d_A$, $\mu_A$), the depth value is stored in background buffer A. If the depth can be represented by Gaussian model ($d_B$, $\mu_B$), the depth value is stored in background buffer B. If both frequencies of candidate background model A and candidate background model B are greater than respective thresholds, both candidate background models will be used. The use of a mixture of two Gaussian distributions provides superior foreground object detection result with cleaner edges at the expense of higher computational complexity. If the higher computational cost associated with the mixture of Gaussian distributions is not desirable, an alternative method based on post processing can be used which may require lower computational cost. Since the edge pixels are generally clustered in very small regions and may be removed in post processing techniques known in the field.

While Gaussian distribution is used to model the statistical characteristic of the depth value, other distribution models may also be used. Furthermore, it is possible to use other simple parametric method to describe the underlying depth value. For example, the Gaussian distribution model may be degenerated to a representative value and an error tolerance in practice. When the Gaussian distribution model $\eta(m, \mu)$ is used, whether a depth value d can be represented by a model is determined according to "if|d−m|<λμ", where λ is a predefined value. If the pixel can be represented by the Gaussian distribution model, the Gaussian distribution model is updated according to the depth value. The Gaussian distribution model update involves noticeable computations. However, when the simplified model is used, the representative value may be used to replace m and no model update is involved. For example, the representative value may be selected according to the farthest depth value seen at a pixel. An error tolerance can be used as an equivalence of μ or λμ. Therefore, there is no need to build and maintain a background distribution model. This is an alternative method to use a background distribution model.

Figure 10:
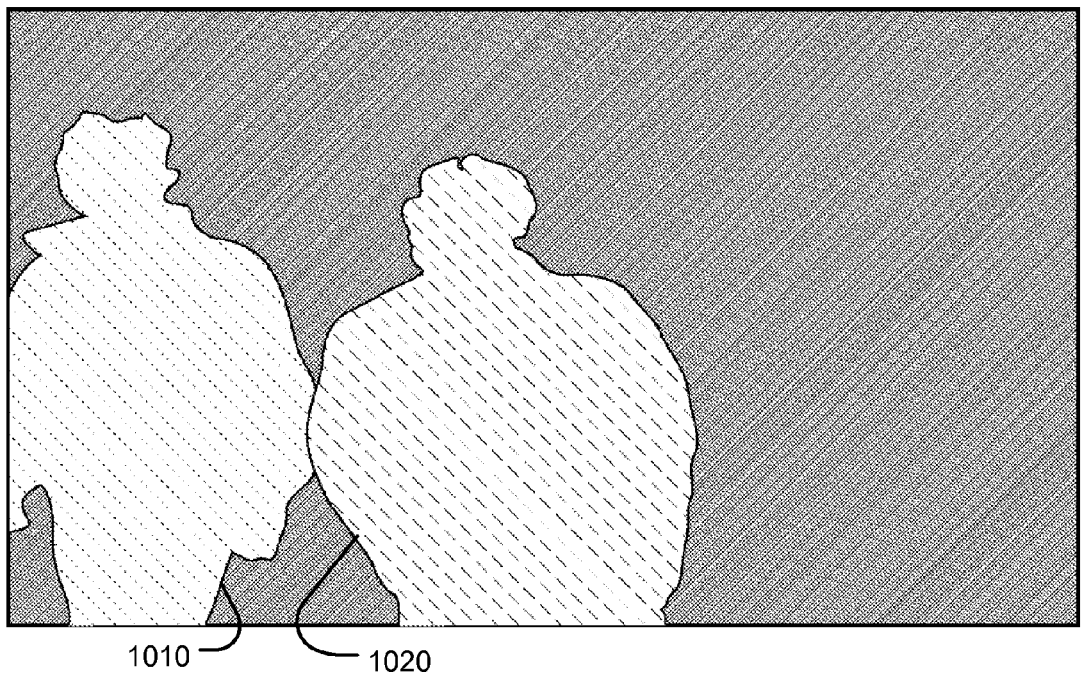
FIG. 10 illustrates exemplary background determination result based on depth information incorporating an embodiment of the present invention.

FIG. 10 illustrates an exemplary foreground object detection result based on depth information incorporating an embodiment of the present invention. As shown in FIG. 10, the method incorporating an embodiment of the present invention provides very clean foreground object detection for two human subjects 1010 and 1020 in the foreground.

While foreground object detection methods incorporating embodiments of present invention are based on the depth information, the methods may also utilize color/intensity information. The use of joint depth and color/intensity information for foreground object detection may involve high computational cost. Therefore, color/intensity information should be used selectively to avoid high computational cost.

For example, depth information may not be available for areas that absorb infrared light radiated from the depth camera. Therefore these areas result in non-meaningful pixels. While an embodiment according to the present invention handles the situation by labeling non-meaningful pixels as background pixels without updating the background distribution model, the use of color/intensity information may improve the performance. In order to alleviate the high computational cost associated with foreground object detection method based on color/intensity information, the color/intensity information is only used for these pixels where the depth information is not available. Another situation that color/intensity information may be useful is the object edges where the depth information around object edges may not be reliable. One embodiment according to the present invention utilizes a mixture of two Gaussian distributions to overcome the object edge problem. Alternatively, a conventional color/intensity information based approach may be used in the areas around objects edges to enhance the performance of the foreground object detection.

In yet another foreground object detection method incorporating an embodiment of the present invent, the background confidence at each pixel is provided. The background confidence provides a confidence indication regarding how reliable the background value. In one example, the background confidence (BC) is determined according to: $BC=(a-z)/t$, where a is the number of times that the current depth value is determined to be background, z is the number of times that the pixel has a zero value, and t is the total number of times the pixel is determined to be a background pixel. Other forms may also be used to measure the background confidence as well. In case that a pixel has a low background confidence, other means may be used to enhance the background confidence. For example, for pixels having background confidence below a threshold, a conventional foreground object detection method based on color/intensity information may be used.

Embodiments of foreground object detection according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of background detection for a pixel around object edges from depth images using a first background distribution model or a mixture of the first background distribution model and a second background distribution model, the method comprising:
   receiving a depth value for the pixel from the depth images;
   updating the first background distribution model according to the depth value if the pixel can be represented by the first background distribution model;
   skipping update of the first background distribution model if the pixel is before a background associated with the first background distribution model;
   establishing a candidate background distribution model and evaluating a first occurrence frequency and a second occurrence frequency associated with representation of the pixel by the first background distribution model or the candidate background distribution model respectively, if the pixel is behind the background associated with the first background distribution model;
   establishing the second background distribution model from the candidate background distribution model if the first occurrence frequency and the second occurrence frequency indicates high occurrence;
   discarding the candidate background distribution model if the first occurrence frequency indicates the high occurrence and the second occurrence frequency indicates low occurrence;
   replacing the first background distribution model by the candidate background distribution model if the first occurrence frequency indicates the low occurrence and the second occurrence frequency indicates the high occurrence; and
   processing the pixel using the mixture of the first background distribution model and the second background distribution model if the second background distribution model exists, and using a single background distribution model based on the first background distribution model otherwise.

2. An apparatus for background detection for a pixel around object edges from depth images using a first background distribution model or a mixture of the first background distribution model and a second background distribution model, the apparatus comprising one or more electronic circuits configured to:
   receive a depth value for the pixel from the depth images;
   update the first background distribution model according to the depth value if the pixel can be represented by the first background distribution model;
   skip update of the first background distribution model if the depth value indicates that the pixel is closer than a background associated with the first background distribution model;
   establish a candidate background distribution model and means for evaluating a first occurrence frequency and a second occurrence frequency associated with representation of the pixel by the first background distribution model or the candidate background distribution model respectively, if the depth value indicates that the pixel is farther than the background associated with the first background distribution model;
   establish the second background distribution model from the candidate background distribution model if the first occurrence frequency and the second occurrence frequency indicates high occurrence;

discard the candidate background distribution model if the first occurrence frequency indicates the high occurrence and the second occurrence frequency indicates low occurrence;

replace the first background distribution model by the candidate background distribution model if the first occurrence frequency indicates the low occurrence and the second occurrence frequency indicates the high occurrence; and process the pixel using the mixture of the first background distribution model and the second background distribution model if the second background distribution model exists, and using a single background distribution model based on the first background distribution model otherwise.

* * * * *